(12) United States Patent
Schommer et al.

(10) Patent No.: US 9,279,670 B2
(45) Date of Patent: Mar. 8, 2016

(54) METHOD AND DEVICE FOR CALIBRATING AND ADJUSTING A VEHICLE SURROUNDINGS SENSOR

(75) Inventors: Stefan Schommer, Unterschleissheim (DE); Christian Wagmann, Munich (DE); Axel Wendt, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 93 days.

(21) Appl. No.: 13/992,979

(22) PCT Filed: Dec. 5, 2011

(86) PCT No.: PCT/EP2011/071749
§ 371 (c)(1),
(2), (4) Date: Aug. 20, 2013

(87) PCT Pub. No.: WO2012/076468
PCT Pub. Date: Jun. 14, 2012

(65) Prior Publication Data
US 2013/0325252 A1    Dec. 5, 2013

(30) Foreign Application Priority Data

Dec. 9, 2010    (DE) .......................... 10 2010 062 696

(51) Int. Cl.
| G01S 7/40 | (2006.01) |
| G01B 11/27 | (2006.01) |
| G01S 7/497 | (2006.01) |
| G01S 7/52 | (2006.01) |
| G01S 13/93 | (2006.01) |
| G01S 15/93 | (2006.01) |
| G01S 17/93 | (2006.01) |

(52) U.S. Cl.
CPC . *G01B 11/27* (2013.01); *G01S 7/40* (2013.01); *G01S 7/4972* (2013.01); *G01S 7/52004* (2013.01); *G01S 13/931* (2013.01); *G01S 15/931* (2013.01); *G01S 17/936* (2013.01); *G01S 2013/9385* (2013.01)

(58) Field of Classification Search
CPC ... G01B 11/27; G01S 7/4972; G01S 7/52004; G01S 7/40
See application file for complete search history.

(56) References Cited

U.S. PATENT DOCUMENTS

| 6,778,928 B2* | 8/2004 | Stiller | G01C 21/26 702/104 |
| 6,915,228 B2* | 7/2005 | Uffenkamp | G01D 18/00 348/47 |
| 6,975,265 B2* | 12/2005 | Schlick | G01S 7/4004 342/165 |
| 8,638,452 B2* | 1/2014 | Muhle | G01B 11/2755 356/139.09 |

(Continued)

FOREIGN PATENT DOCUMENTS

| CN | 1764818 | 4/2006 |
| CN | 101059351 | 10/2007 |

(Continued)

OTHER PUBLICATIONS machine translation of Schommer et al., DE 102008042018 (2008).*
Abraham, Steffen, et al. "Optische 3D-Messtechnik zur Fahrwerksvermessung in der Kfz-Werkstatt," Oldenburger 3D-Tage, Wichmann Verlag, 2010.
International Search Report, PCT International Application No. PCT/EP2011/071749, dated Apr. 5, 2012.

*Primary Examiner* — Jonathan M Dager
(74) *Attorney, Agent, or Firm* — Kenyon & Kenyon LLP

(57) ABSTRACT

A method for adjusting and/or calibrating a surroundings sensor in a vehicle using a measuring unit and a calibration panel.

10 Claims, 3 Drawing Sheets

(56) References Cited

U.S. PATENT DOCUMENTS

| | | | | |
|---|---|---|---|---|
| 8,918,302 B2* | 12/2014 | Hukkeri | ................ | G01S 7/4021 |
| | | | | 702/95 |
| 9,140,626 B2* | 9/2015 | Amirpour | ........... | G01M 17/007 |
| 2006/0164295 A1* | 7/2006 | Focke | ....................... | G01S 7/40 |
| | | | | 342/174 |
| 2010/0318307 A1* | 12/2010 | Schommer | ............. | G01B 11/27 |
| | | | | 702/94 |
| 2011/0221867 A1* | 9/2011 | Nobis | .................. | G01B 11/275 |
| | | | | 348/46 |
| 2012/0197478 A1* | 8/2012 | Niemz | ............... | B62D 15/0285 |
| | | | | 701/25 |
| 2013/0188020 A1* | 7/2013 | Seifert | ............... | G01B 11/2755 |
| | | | | 348/46 |
| 2013/0342686 A1* | 12/2013 | Wagmann | .......... | G01B 11/2755 |
| | | | | 348/139 |
| 2014/0074344 A1* | 3/2014 | Amirpour | ............ | G07C 5/0808 |
| | | | | 701/29.6 |
| 2015/0081188 A1* | 3/2015 | Kornhaas | .................. | B60T 7/22 |
| | | | | 701/70 |

FOREIGN PATENT DOCUMENTS

| | | |
|---|---|---|
| DE | 10 2008 042 018 | 3/2010 |
| EP | 1 376 051 | 1/2004 |
| WO | WO 01/71280 | 9/2001 |

\* cited by examiner

METHOD AND DEVICE FOR CALIBRATING AND ADJUSTING A VEHICLE SURROUNDINGS SENSOR

FIELD

The present invention relates to a method and a device for aligning a calibrating and adjusting devices used to calibrate and adjust optoelectronic surroundings sensors in vehicles, in particular motor vehicles.

BACKGROUND INFORMATION

The calibration and adjustment of sensors for driver assistance systems in a (motor) vehicle generally include determining the location of a surroundings sensor in relation to the chassis geometry or a defined vehicle coordinate system.

In the repair shop, for example, the location of a video camera for using driver assistance functions (e.g., for a warning when departing from the lane, detecting objects and the like) is to be recalibrated in relation to the chassis geometry after the camera has been installed or after major changes are made to the chassis. Radar sensors for automatic speed control, e.g., ACC (Adaptive Cruise Control), frequently must be mechanically adjusted to the chassis geometry, due to their narrow opening angle.

Examples of the calibration and adjustment of sensors for driver assistance systems are:

Testing and adjusting radar-based distance sensors ("Adaptive Cruise Control")
Testing and adjusting infrared-based distance sensors ("lidar")
Testing and calibrating rear view camera systems ("rear view")
Testing and calibrating lane keeping camera systems ("lane departure warning")
Testing and calibrating lane changing assistants ("blind spot detection")
Infrared night view camera ("night view")
Surroundings camera systems ("side view," "top view")

The following requirements must be established to calibrate and adjust sensors for driver assistance systems:

Known chassis geometry for defining the vehicle coordinate system
Orienting a calibrating/adjusting means in the field of vision of the sensor to be calibrated/adjusted at a predefined position in relation to the chassis coordinate system To ensure a known chassis geometry and to reduce costs and complexity, calibrating and adjusting devices are often offered as add-ons to measuring devices for chassis measurement.

A method for calibrating a video camera sensor, which is described, for example, in German Patent Application No. DE 10 2008 042 018 A1, is described below by way of example with reference to FIG. 1. The relation between the coordinate systems described below for determining the chassis geometry is implemented with the aid of optical 3D measuring systems, as described by Steffen Abraham, Axel Wendt, Günter Nobis, Volker Uffenkamp and Stefan Schommer in *Optische 3D-Messtechnik zur Fahrwerksvermessung in der Kfz-Werkstatt* (3D Measuring Systems for Chassis Measurement in the Automotive Repair Shop), Oldenburger 3D-Tage, Wichmann Verlag, 2010.

To measure the chassis, wheel clamps 28, 30 are mounted on wheels 12, 14 of a vehicle 7, to which, in turn, wheel measuring panels (targets) 20, 22 having photogrammetric measuring marks are attached. A measuring head 32, 46 is situated on the left and right sides of vehicle 7. Each measuring head 32, 46 includes two stereo camera systems, each of which has two cameras 36, 38, 40, 42, 50, 52 54, 56 and one reference system 44, 58.

The geometry of cameras 36, 38, 40, 42, 50, 52 54, 56 of the two stereo camera systems of a measuring head 32, 46 is calibrated both intrinsically and extrinsically with regard to its relative orientation. The calibration makes it possible to determine the 3D coordinates of the measuring marks on wheel measuring panels 20, 22 within coordinate system $X_V$ (front) or $X_H$ (rear) of particular measuring head 32, 46 within a shared measuring head coordinate system $X_L$ (left) or $X_R$ (right). The wheel measuring panels 20, 22 used do not have to be high precision pass point panels having premeasured measuring points.

Provided that wheel measuring panels 20, 22 are attached to wheels 12, 14 in a mechanically stable manner, the 3D location of wheel axle 13 may be determined continuously in all four stereo camera systems 36, 38; 40, 42; 50, 52; 54, 56. Reference systems 44, 58 furthermore continuously measure the toe angle between measuring heads 32, 46 and the tilting of measuring heads 32, 46. This makes it possible to calculate the chassis variables, e.g., the toe and camber angles, as well as other variables of the chassis, such as the steering geometry, including the kingpin and caster angles. Geometric vehicle coordinate system $X_M$ is finally defined by vehicle longitudinal axis 64, which is predefined by the toe of rear wheels 12, 14 now being measured.

The goal of the calibration is to determine the location and orientation of the camera of a surroundings sensor 15 within coordinate system $X_M$ of vehicle 7. For this purpose, a calibrating/adjusting device 62 having known measuring mark positions is positioned in front of vehicle 7 at point $X^{T-FIX}$.

For the calibration operation, calibrating/adjusting device 62 is monitored by the camera of surroundings sensor 15 of the driver assistance system. The image coordinates of measuring marks on calibrating/adjusting device 62 are measured by the driver assistance system. Absolute orientation $X_C$ of the camera in relation to calibrating/adjusting device $X^{T-FIX}$ is determined by a spatial resection. This optical measuring step is carried out by control unit 17 of the driver assistance system in vehicle 7. The calibration step is started via the diagnostic interface of control unit 17 in vehicle 7.

To be able to determine the installation angles (pitch, yaw and roll angles) and other parameters of the camera in relation to the chassis geometry, the position of calibrating/adjusting device $X^{T-FIX}$ within coordinate system $X_M$ of vehicle 7 is known to control unit 17 in vehicle 7. The software in control unit 17 requires that calibrating/adjusting device 62 be located at permanently defined position $X^{T-FIX}$ known to control unit 17. Only if this is the case will the installation angles ascertained by control unit 17 be correct.

The manual orientation of calibrating/adjusting device 62 to position $X^{T-FIX}$ is associated with a certain amount of time and requires extensive knowledge of the calibration operation on the part of the auto mechanic. An imprecisely oriented calibrating/adjusting device 62 results in accuracy losses during calibration and adjustment of the camera or surroundings sensor 15.

SUMMARY

An object of the present invention is to provide a method and a device for easy and reliable adjustment and/or calibration of a surroundings sensor in a vehicle.

An example method according to the present invention includes:

a1) attaching at least one wheel target to at least one of the wheels of one axle of the vehicle;

a2) recording at least one image of the wheel target with the aid of at least one measuring unit;

a3) determining the position and orientation of the vehicle in space from the recorded image of the wheel target;

b1) placing at least one calibrating panel having at least one calibrating panel target in the field of vision of the at least one measuring unit;

b2) recording at least one image of the calibrating panel target with the aid of the measuring unit;

b3) determining the position of the calibrating panel in relation to the vehicle from the recorded image of the calibrating panel target and the position and orientation of the vehicle in space determined in step a3);

c1) recording at least one image of the calibrating panel with the aid of the surroundings sensor of the vehicle;

c2) determining the position and orientation of the surroundings sensor in relation to the calibrating panel from the image of the calibrating panel recorded with the aid of the surroundings sensor;

d) determining the position and orientation of the surroundings sensor in relation to the vehicle from the position and orientation of the surroundings sensor in relation to the calibrating panel determined in step c2) and the position of the calibrating panel in relation to the vehicle determined in step b3).

An example device according to the present invention for adjusting and/or calibrating a surroundings sensor in a vehicle includes:

at least one wheel target, the wheel target being designed for mounting on a wheel of the vehicle;

at least one calibrating panel which has at least one calibrating panel target; at least one measuring unit which is designed to record at least, one image of the wheel/calibrating panel target(s) and to determine the spatial positions of the wheel/calibrating panel target(s) from the at least one recorded image; and a control unit which is connected to the surroundings sensor and is designed to (a) determine the position and orientation of the surroundings sensor in relation to the calibrating panel from the image of the calibrating panel recorded with the aid of the surroundings sensor; and (b) determine the position and orientation of the surroundings sensor in relation to the vehicle from the previously determined position and orientation of the surroundings sensor in relation to the calibrating panel and the position and orientation of the calibrating panel and the vehicle determined by the measuring unit.

The determination of the position of the calibrating panel preferably also includes the determination of the orientation of the calibrating panel in space.

By determining the position and orientation of the surroundings sensor in relation to the vehicle from the previously determined orientation of the surroundings sensor in relation to the calibrating panel and from the orientation of the calibrating panel in relation to the vehicle previously determined with the aid of the measuring unit, the spatial orientation of the surroundings sensor in relation to the vehicle may be determined with a high degree of accuracy without requiring an exact manual orientation of the calibrating panel to a previously defined position.

The method may be carried out quickly, since a time-consuming, exact manual orientation of the calibrating panel is eliminated. The method has a high degree of accuracy, since errors arising from imprecise orientation of the calibrating panel are reliably avoided.

The manual orientation of the calibrating panel is generally not completely eliminated. However, the calibrating panel must be only approximately oriented in the field of vision of the camera of the surroundings sensor and the measuring units, depending on the vehicle type.

In one specific embodiment, the position of the calibrating panel determined by the measuring unit is transmitted to the control unit. The transmission may take place wirelessly or in a wirebound manner, i.e., via a cable. A wireless transmission is particularly convenient, since no cables need to be laid, and the freedom of movement of the mechanic during the calibration operation is not restricted by cables. The transmission of the spatial position of the calibrating panel via a cable is particularly easy, cost-effective and reliable.

By transmitting the position of the calibrating panel to the control unit, the exact position of the calibrating panel is known to the control unit, and the control unit may precisely determine the spatial orientation of the surroundings sensor in relation to the vehicle.

In one specific embodiment, the calibrating panel is moved to a predefined position by at least one mechanical actuating device activated by the measuring unit, after the position of the calibrating panel has been determined by at least one of the measuring units. The calibrating panel is preferably aligned in a predefined orientation.

Since the predefined position and possibly the orientation is/are known to the control unit, the control unit may precisely determine the spatial position and orientation of the surroundings sensor in relation to the vehicle without it being necessary to transmit the position of the calibrating panel determined by the measuring units to the control unit. In this specific embodiment, the control unit does not require a receiving device to receive the signals emitted by the measuring units and is therefore cost-effective to implement.

In one specific embodiment, at least one of the actuating devices is designed as a compressed air, hydraulic or electric motor. Motors of this type are particularly suitable for orienting the calibrating panels to the desired position reliably and with a high degree of accuracy. Hydraulic and compressed air drives are particularly suitable, since the heavy components of the drive, e.g., the compressor, may be situated outside the calibrating panel and a frame supporting the calibrating panel. When the calibrating panel moves, therefore, only a small mass has to move, so that only a small force is required for moving the calibrating panel, and inaccuracies during positioning, which may arise from the inertia, are minimized. Electric motors are easy to activate and permit a particularly easy and cost-effectively implemented mechanical movement of the calibrating panel.

In one specific embodiment, geometric patterns which have, e.g., a number of dots, are provided on the calibrating panel and/or the targets. Calibrating panels and targets which have patterns of this type have proven to be particularly suitable for precise detection by optical sensors and for determining their position.

In one specific embodiment, the control unit outputs instructions for the manual positioning of the calibrating panel by the operator (auto mechanic). The calibrating panel may be moved particularly rapidly and reliably to a position predefined by the control unit without requiring a mechanical actuating device to move the calibrating panel.

In one specific embodiment, at least one measuring device is provided on each of the two sides of the vehicle. By recording images and conducting measurements on both sides of the vehicle, i.e., on the left and right of the vehicle, the position and orientation of the vehicle and the calibrating panel may be determined with a high degree of accuracy, so that the position and orientation of the surroundings sensor in relation to the vehicle may be precisely determined. In particular, it is not necessary in this case to orient the calibrating panel at an exact right angle to the longitudinal axis of the vehicle, since a spatial orientation of the calibrating panel which deviates from a right angle may be determined with the aid of the measuring units and taken into account in the evaluation.

The present invention is explained in greater detail below on the basis of exemplary embodiments with reference to the figures.

DETAILED DESCRIPTION OF EXAMPLE EMBODIMENTS

Figure 1:
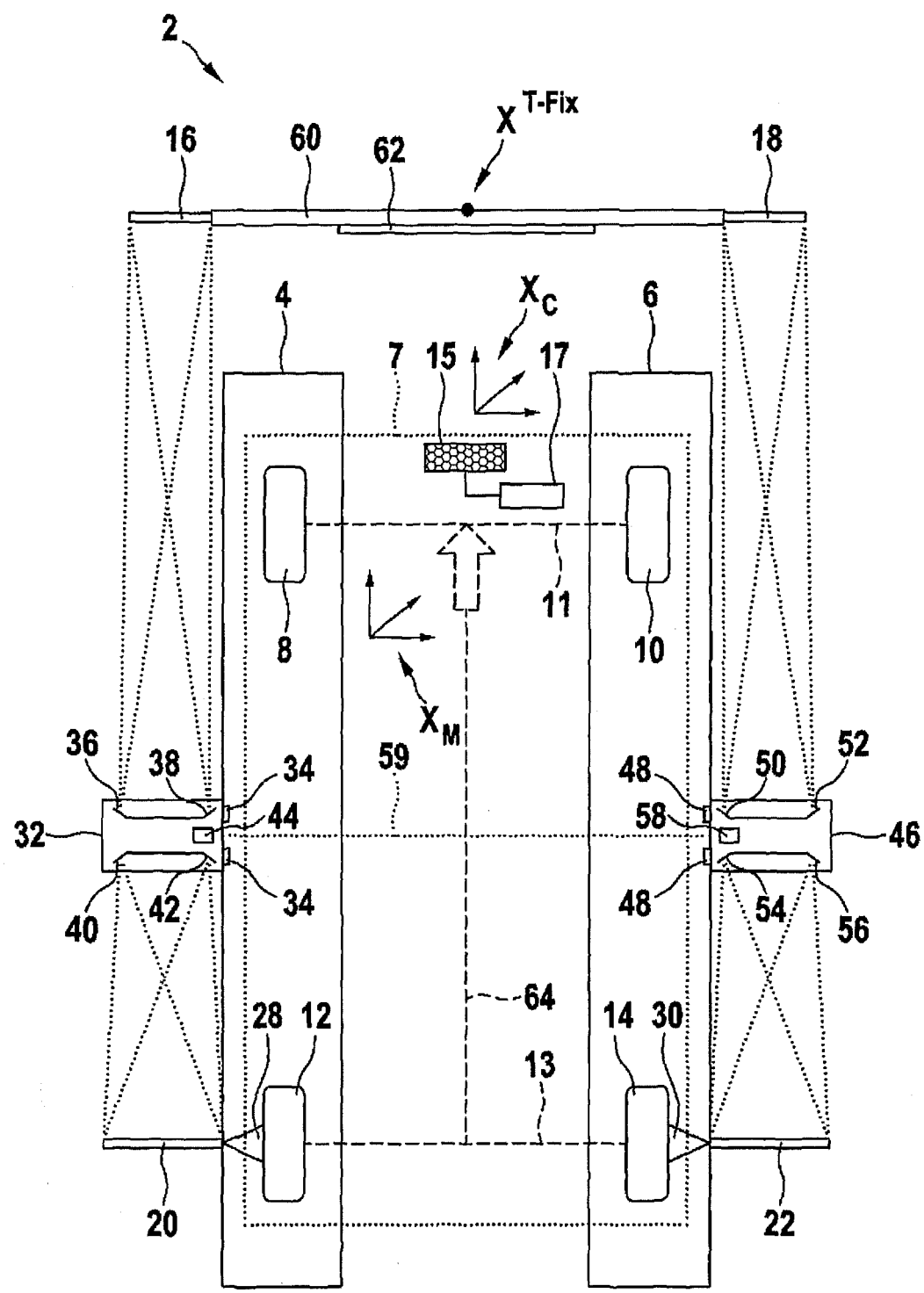
FIG. 1 shows a schematic diagram of an adjusting/calibrating system for a vehicle surroundings sensor according to one exemplary embodiment of the present invention.

The adjusting or calibrating system for a vehicle surroundings sensor illustrated in a schematic top view in FIG. 1 includes a vehicle 7 positioned on tracks 4, 6 of a measuring station 2, which has a chassis measuring device. To simplify the representation, only wheels 8, 10, 12 and 14 of motor vehicle 7 are shown, and the dimensions of the body of vehicle 7 are indicated by a dashed outline. Front axle 11 and rear axle 13 of vehicle 7 are represented by dashed horizontal lines. Geometric vehicle longitudinal axis 64 is represented as a dashed arrow, which runs from the central point of rear axle 11 to the central point of front axle 13. Vehicle 7 has a vehicle surroundings sensor 15 approximately in the middle of the front side of the vehicle, which is adjusted or calibrated with the aid of an adjusting/calibrating system according to the present invention for a vehicle surroundings sensor.

The chassis measuring device includes wheel targets 20 and 22, which are attached to rear wheels 12 and 14 of motor vehicle 7 with the aid of quick-release clamping units 28 and 30, as well as a left measuring unit 32 and a right measuring unit 46, which are attached to tracks 4 and 6 approximately in the central position in relation to the longitudinal extension of tracks 4 and 6 with the aid of fastening adapters 34 and 48 and which extend outwardly therefrom. Wheel targets 20, 22 are designed, for example, in the shape of a disk and are oriented to the outside. The main extension direction of wheel targets 20, 22 runs on a vertical plane through the rotation axis of wheels 12 and 14.

Left measuring unit 32 has an outer, forward-directed measuring camera 36, an inner, forward-directed measuring camera 38, an outer, backward-directed measuring camera 40 and an inner, backward-directed measuring camera 42.

Correspondingly, right measuring unit 46 includes an inner, forward-directed measuring camera 50, an outer, forward-directed measuring camera 52, an inner, backward-directed measuring camera 54 and an outer, backward-directed measuring camera 56. Each set of two measuring cameras 36, 38, 40, 42, 50, 52, 54, 56 thus forms a forward-directed or backward-directed stereo camera system.

The field of vision of backward-directed measuring cameras 40, 42, 54, 56 is dimensioned in each case in such a way that left wheel target 20 or right wheel target 22 is located entirely therein.

Measuring units 32, 46 illustrated in FIG. 1 are preferably mobile measuring units 32, 46, which are suspended on tracks 4 and 6 with the aid of fastening adapters, or which are screwed to tracks 4 and 6; magnetic adaptation is also possible. In principle, measuring units 32 and 46 may be connected to tracks 4 and 6 in any suitable way. Detachable connections offer the advantage that measuring units 32 and 46 may be easily removed and used at other workstations.

Measuring units 32 and 46 have a cross-referencing feature which is shown in the figure by cross-reference cameras 44 and 58, which are oriented in the transverse direction of the vehicle and detect optical features 34, 48 on the tracks or measuring units 32, 46 situated opposite each other for the purpose of thereby ascertaining the relative position of measuring units 32, 46 in relation to each other. For example, these optical features 34, 48 may be designed as LEDs or reflective measuring point marks. Cross-reference cameras 44, 58 are situated above or below tracks 4, 6, in any case below the floor of vehicle 7, in such a way that an unobstructed cross-view connection exists. The cross-view connection for cross-referencing between cross-reference cameras 44 and 58 is illustrated in FIG. 1 by a dotted horizontal line 59.

Measuring units 32, 46 may furthermore have a tilt sensor, which is not illustrated in FIG. 1, with the aid of which the tilting of measuring units 32, 46 may be determined.

A frame 60 is situated in front of vehicle 7, which is essentially oriented transversely to vehicle longitudinal axis 64 and which extends from a width position to the left of left track 4 to a width position to the right of right track 6. Receptacles, which are not illustrated in FIG. 1, are situated at the side ends of frame 60 for targets to be attached thereto and to each of which one target 16, 18 is fastened.

A calibrating panel 62, which is situated on the side of frame 60 oriented in the direction of vehicle 7, extends approximately from a width position corresponding to the right end of left track 4 to a width position corresponding to the left end of right track 6.

The focal length of forward directed measuring cameras 36, 38 of left measuring unit 32 and the focal length of forward directed measuring cameras 50, 52 of right measuring unit 46 are each configured in such a way that targets 16, 18 situated in the side receptacles of frame 60 are located fully in the field of vision thereof, as illustrated by the dotted lines in FIG. 1.

Vehicle surroundings sensor 15 is connected to a control and evaluating unit 17, which receives and evaluates the signals of vehicle surroundings sensor 15 for the purpose of determining the parameters relevant for calibrating and adjusting vehicle surroundings sensor 15 from the signals of vehicle surroundings sensor 15.

Control and evaluating unit 17 is connected to measuring units 32 and 46 via a wireless connection which is designed, for example, as a radio or infrared connection or via a cable connection which is not illustrated in the drawing, so that the positions of targets 16, 18, 20, 22 ascertained by measuring units 32 and 46 are transmittable to control and evaluating unit 17.

Alternatively, measuring units 32 and 46 may be connected to an external evaluating unit, e.g., a personal computer, which is not illustrated in FIG. 1 and which evaluates the images of measuring cameras 36, 38, 40, 42, 50, 52, 54, 56 for the purpose of determining the spatial position of targets 16, 18, 20, 22. In this case, the evaluating unit is designed to transmit the ascertained positions of targets 16, 18, 20, 22 to control and evaluating unit 17.

To be able to determine the installation angles (pitch, yaw and roll angles) and other parameters of the camera in relation to the chassis geometry which relate to a known position of calibrating panel 62, the position of calibrating panel 62 in relation to coordinate system $X_M$ of vehicle 7 must be taken into account.

The 3D transformations to be taken into account, which are formulated as examples for the transformation of a point of camera coordinate system $X_C$ into coordinate system $X_M$ of vehicle 7, are as follows:

$$P_M = T_T^M + R_T^M (T_T^M + R_T^M P_C)$$

where $P_C$: Point in coordinate system $X_C$ of the camera
$P_M$: Point in coordinate system $X_M$ of the vehicle
$R_T^M$, $R_T^M$: Rotation matrix between the particular coordinate systems
$T_T^M$, $T_T^M$: Translation vector between the particular coordinate systems This formula shows the relation between camera coordinate system $X_C$ and coordinate system $X_M$ of vehicle 7, taking into account an arbitrary orientation of calibrating panel 62.

Point $P_M$ is furthermore converted into this setpoint position with the aid of defined orientation $X^{T-FIX}$:

$$P_{T-FIX} = T_M^{T-FIX} + R_M^{T-FIX} P_M$$

where $P_{T-FIX}$: Point in setpoint position $X^{T-FIX}$ of the calibrating panel
$P_M$: Point in coordinate system $X_M$ of the vehicle
$R_M^{T-FIX}$: Rotation matrix between coordinate system $X_M$ of the vehicle and setpoint position $X^{T-FIX}$ of the calibrating panel
$T_M^{T-FIX}$: Translation vector between coordinate system $X_M$ of the vehicle and setpoint position $X^{T-FIX}$ of the calibrating panel Since the installation angles (pitch, yaw and roll angles) and other parameters of the camera are defined in this setpoint position $X^{T-FIX}$, the feasibility of the calibration in an arbitrary orientation of calibrating panel 62 is shown.

Figure 2:
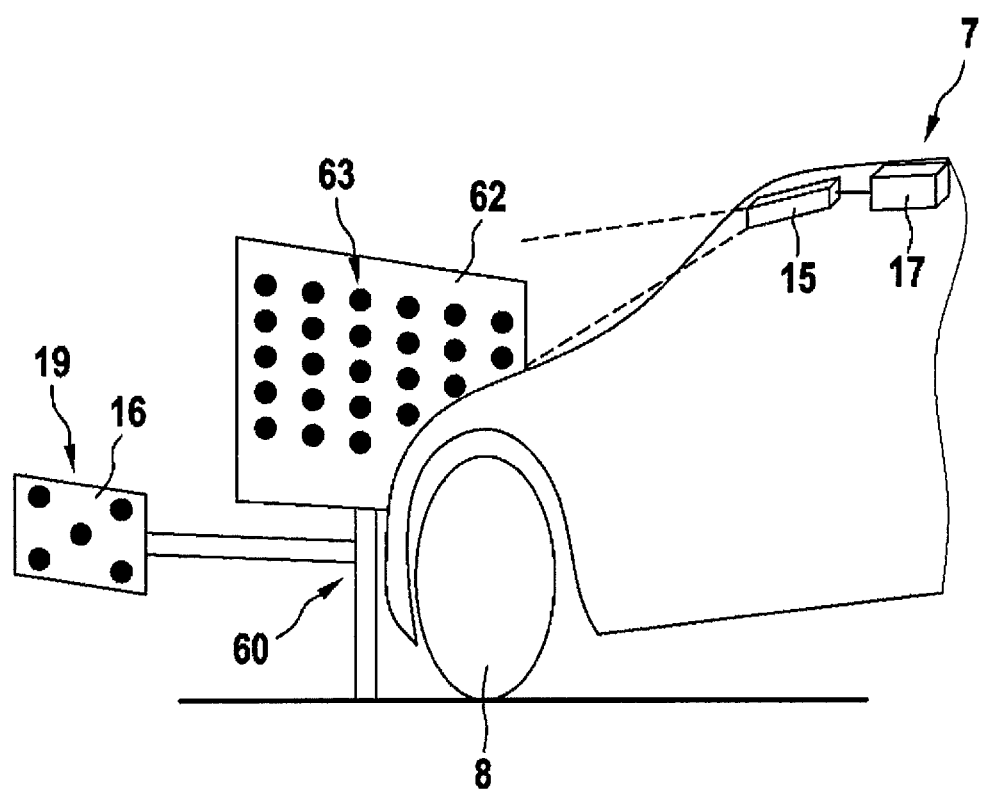
FIG. 2 shows a perspective view of an adjusting/calibrating system for a vehicle surroundings sensor according to a first exemplary embodiment of the present invention.

FIG. 2 shows a perspective view of a vehicle 7 having a surroundings sensor 15, which is positioned in front of a calibrating panel 62.

Calibrating panel 62, on which a pattern 63 having a number of dots is provided, is attached to a frame 60, to which a calibrating panel target 16 is mounted, which also has a dot pattern 19.

Dot pattern 19 of calibrating panel 62 is detected by a camera of surroundings sensor 15, which is situated within vehicle 7, and the image recorded by the camera is transmitted to and evaluated by control unit 17 connected to surroundings sensor 15 for the purpose of determining the position of calibrating panel 62 in relation to surroundings sensor 15 in coordinate system $X_C$ of surroundings sensor 15.

Dot pattern 63 of calibrating panel target 16 is detected and evaluated by cameras 36, 38 of at least one measuring unit 32, which is not illustrated in FIG. 2 and which is situated alongside vehicle 7, for the purpose of determining the position of calibrating panel target 16 in relation to measuring unit 32. Since the position of calibrating panel 62 in relation to calibrating panel target 16 is defined and known by frame 60, the position of calibrating panel 62 in relation to measuring unit 32 may be precisely determined. Since measuring unit 32, as shown in FIG. 1, also detects a wheel target 20, which is fastened to the rear axle of vehicle 7 and which is not visible in FIG. 2, it is possible to determine exact position $X^{T-FIX}$ of calibrating panel 62 in relation to vehicle 7 in coordinate system $X_M$ of vehicle 7.

The position of calibrating panel 62 in coordinate system $X_M$ of vehicle 7 determined in this way is transmitted wirelessly or via a wired connection, which is not illustrated in FIG. 2, to control unit 17 in vehicle 7, which is able to determine the position of calibrating panel 62 in coordinate system $X_M$ of vehicle 7 with the aid of this information and the known position of calibrating panel 62 in relation to surroundings sensor 15, for the purpose of adjusting or calibrating surroundings sensor 15 in relation to coordinate system $X_M$ of vehicle 7.

Figure 3:
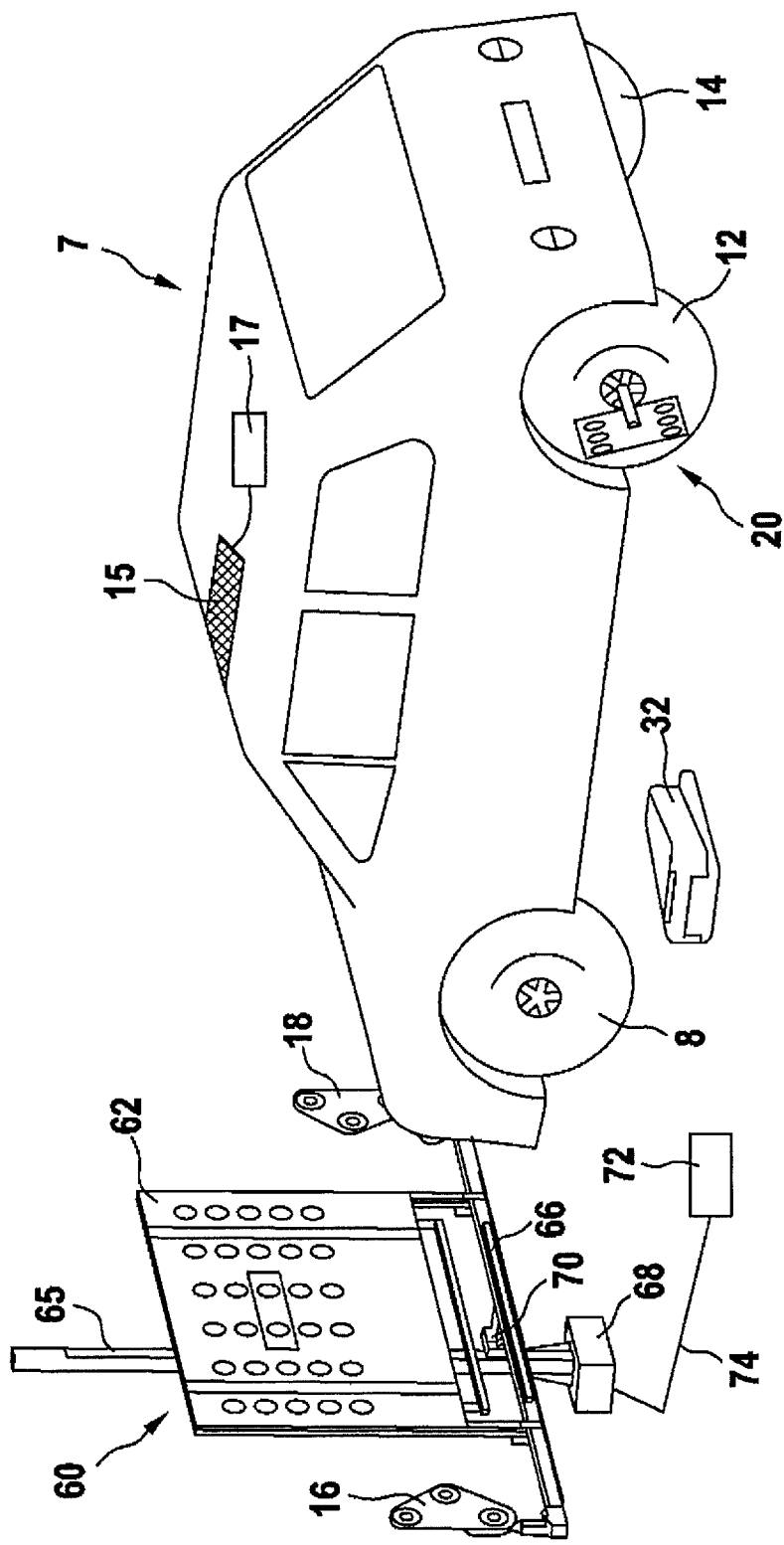
FIG. 3 shows a perspective view of an adjusting/calibrating system for a vehicle surroundings sensor according to a second exemplary embodiment of the present invention.

FIG. 3 shows a perspective view of an alternative exemplary embodiment of an example device according to the present invention.

The features corresponding to the features already illustrated in FIGS. 1 and 2 are provided with the same reference numerals and are not described again in detail.

The second exemplary embodiment illustrated in FIG. 3 differs from the exemplary embodiment illustrated in FIG. 2 in that calibrating panel 62 is movably mounted on frame 60. In particular, frame 60 is equipped with a vertical rail 65 and with a horizontal rail 66, along which calibrating panel 62 is movable in the vertical and horizontal directions. Rails 65, 66 may be designed, for example, as toothed rails with which toothed wheels engage and which roll along the toothed rails during movement of calibrating panel 62.

Additional actuators 70 are provided on frame 60, which are activatable for moving calibrating panel 62 along rails 65, 66 into a desired position. For example, actuators 70 may be designed in such a way that they drive toothed wheels which engage with toothed rails, for the purpose of moving calibrating panel 62 in relation to frame 60.

After measuring unit 32 has detected at least one image of calibrating panel target 16 and determined the spatial position of calibrating panel 62 in relation to measuring unit 32 therefrom, a control and regulating unit 68 connected to measuring units 32, 46 activates actuators 70 in such a way that calibrating panel 62 is moved to a desired, predefined position $X^{T-FIX}$. The instantaneous position of calibrating panel 62 may be continuously detected and monitored by measuring units 32, 46, so that desired, predefined position $X^{T-FIX}$ of calibrating panel 62 may be set very precisely.

Actuators 70 may be electric motors or hydraulically or pneumatically driven actuators 70.

The connection for transmitting the measured data from measuring units 32, 46 to control and regulating unit 68 or from control and regulating unit 68 to actuators 70 may be implemented by cable connections or by wireless connections, e.g., a radio or infrared connection. In the exemplary embodiment illustrated in FIG. 3, a receiving unit 72 is provided which receives the position data transmitted wirelessly from measuring unit 32 and forwards this data to control and regulating unit 68 via data cable 74.

The number of moving axes (degrees of freedom) of calibrating panel 62 may be variably designed, depending on the requirements. In the exemplary embodiment illustrated in FIG. 3, calibrating panel 62 has two degrees of freedom (movement in the x and y directions) in relation to frame 60.

Designs having additional degrees of freedom, such as a movement in the z direction and rotations around one or multiple of the three spatial axes, are also possible. This may further increase the accuracy of the calibration and adjustment of surroundings sensor 15 and improve the convenience for the operator, since greater freedom in the initial position and orientation of frame 60 and calibrating panel 62 exists in measuring station 2.

What is claimed is:

1. A method for adjusting or calibrating a surroundings sensor in a vehicle, comprising:
    a1) attaching at least one wheel target to at least one wheel of the vehicle;
    a2) recording at least one image of the wheel target with the aid of at least one measuring unit;
    a3) determining a position and an orientation of the vehicle in space from the image of the wheel target recorded by the measuring unit;
    b1) placing at least one calibrating panel having at least one calibrating panel target in a field of vision of the at least one measuring unit;
    b2) recording at least one image of the at least one calibrating panel target with the aid of the measuring unit;
    b3) determining a position of the calibrating panel in relation to the vehicle from the recorded image of the calibrating panel target and the determined position and orientation of the vehicle;
    c1) recording at least one image of the calibrating panel with the aid of the surroundings sensor of the vehicle;
    c2) determining a position and an orientation of the surroundings sensor in relation to the calibrating panel from the image of the calibrating panel recorded with the aid of the surroundings sensor; and
    d) determining a position and an orientation of the surroundings sensor in relation to the vehicle from the determined position and orientation of the surroundings sensor in relation to the calibrating panel and the determined position of the calibrating panel in relation to the vehicle.

2. The method as recited in claim 1, further comprising:
    transmitting the position of the calibrating panel determined in step b3) to a control unit.

3. The method as recited in claim 2, wherein the transmission of the position of the calibrating panel to the control unit takes place via one of: i) at least one cable, or ii) wirelessly.

4. The method as recited in claim 2, wherein the control unit outputs instructions on positioning of the calibrating panel.

5. The method as recited in claim 4, further comprising:
    activating at least one actuator acting upon the calibrating panel in such a way that the calibrating panel is moved at least one of: i) to a predefined position, and ii) into a predefined spatial orientation.

6. A device for adjusting or calibrating a surroundings sensor in a vehicle, comprising:
    at least one wheel target designed for mounting on a wheel of the vehicle;
    at least one calibrating panel which has at least one calibrating panel target;
    at least one measuring unit which is designed to record at least one image of the wheel target and the calibrating panel and to determine a spatial position of the wheel target and the calibrating panel from the recorded image; and
    a control unit which is connected to the surroundings sensor and is designed to
        (a) determine the spatial position of the calibrating panel in relation to the surroundings sensor from an image of the calibrating panel recorded by the surroundings sensor; and
        (b) determine the position and orientation of the surroundings sensor in relation to the vehicle from the position and orientation of the surroundings sensor in relation to the calibrating panel and the position of the calibrating panel in relation to the vehicle determined by the measuring unit.

7. The device as recited in claim 6, wherein the at least one measuring unit and the control unit are designed to transmit the position of the calibrating panel target determined by the measuring unit to the control unit.

8. The device as recited in claim 6, further comprising:
    at least one actuator which is connected to the calibrating panel in such a way that at least one of the position and the orientation of the calibrating panel is alterable by driving the actuator.

9. The device as recited in claim 8, wherein at least one measuring unit is coupled with the actuator and is designed to activate the actuator in such a way that the calibrating panel is movable at least one of to a predefined spatial position, and into a predefined spatial orientation by driving the actuator.

10. The device as recited in claim 6, wherein at least one of the measuring devices is provided on both sides of the vehicle.

* * * * *